(12) United States Patent
Woelfle et al.

(10) Patent No.: US 10,974,774 B2
(45) Date of Patent: Apr. 13, 2021

(54) AIR GUIDE DEVICE FOR A VEHICLE

(71) Applicant: Dr. Ing. h.c. F. Porsche Aktiengesellschaft, Stuttgart (DE)

(72) Inventors: Fred Woelfle, Sindelfingen (DE); Sebastian Weber, Esslingen (DE); Joachim Paul, Benningen a.N. (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 80 days.

(21) Appl. No.: 16/531,134

(22) Filed: Aug. 5, 2019

(65) Prior Publication Data

US 2020/0070903 A1 Mar. 5, 2020

(30) Foreign Application Priority Data

Aug. 30, 2018 (DE) ...................... 10 2018 121 151.1

(51) Int. Cl.
*B62D 35/00* (2006.01)

(52) U.S. Cl.
CPC .................................. *B62D 35/007* (2013.01)

(58) Field of Classification Search
CPC ..................................................... B62D 35/007
USPC .......................................... 296/180.5, 180.3
See application file for complete search history.

(56) References Cited

U.S. PATENT DOCUMENTS

| | | | | |
|---|---|---|---|---|
| 6,170,904 B1 * | 1/2001 | Schaedlich | .......... | B62D 35/007 296/180.1 |
| 6,672,651 B1 * | 1/2004 | Shuen | .................. | B62D 35/007 296/180.5 |
| 7,213,870 B1 * | 5/2007 | Williams | ............. | B62D 35/007 296/180.5 |
| 10,173,737 B2 | 1/2019 | Weiss | | |
| 2009/0160215 A1 | 6/2009 | Paul et al. | | |
| 2016/0059911 A1 * | 3/2016 | Shiga | ................... | B62D 35/007 296/180.5 |

FOREIGN PATENT DOCUMENTS

| | | |
|---|---|---|
| DE | 102007061812 A1 | 7/2009 |
| DE | 102009033695 A1 | 1/2011 |
| DE | 102010000634 A1 | 9/2011 |
| DE | 102014118496 A1 | 6/2016 |
| DE | 102016119374 A1 | 4/2018 |
| GB | 2478414 A | 9/2011 |

* cited by examiner

*Primary Examiner* — Joseph D. Pape
(74) *Attorney, Agent, or Firm* — Leydig, Voit & Mayer, Ltd.

(57) ABSTRACT

An air guide device for a vehicle has: a static carrier, which is installable via installation brackets on a body structure of the vehicle, which are connected at a first portion to the body structure and at a second portion to a carrier; an air guide displaceable relative to the static carrier between a retracted rest position and a deployed operating position; a kinematic link arrangement, which has multiple links via which the air guide is displaceable relative to the carrier, wherein the links of the kinematic link arrangement are mounted on first installation brackets; and an adjusting motor, which acts on the kinematic link arrangement for the purposes of displacing the air guide relative to the carrier. The adjusting motor is mounted on a second installation bracket. The carrier, which is made of plastic, is connected by a clip connection to the installation brackets, which comprise plastic or metal.

6 Claims, 3 Drawing Sheets

AIR GUIDE DEVICE FOR A VEHICLE

CROSS-REFERENCE TO PRIOR APPLICATIONS

Priority is claimed to German Patent Application No. DE 10 2018 121 151.1, filed on Aug. 30, 2018, the entire disclosure of which is hereby incorporated by reference herein.

FIELD

The present invention relates to an air guide device for a vehicle.

BACKGROUND

DE 10 2010 000 634 A1 has disclosed a vehicle having an air guide device designed as a rear spoiler module. The air guide device can be installed by means of a carrier part, referred to as installation carrier, on a body structure of the vehicle. The carrier part holds a spoiler which is displaceable by means of an adjusting motor between a retracted rest position and a deployed operating position. The air guide device is a preassembled unit, wherein the carrier part is mounted in centered fashion on the body by means of centering elements.

DE 10 2014 118 496 A1 has disclosed a further air guide device for a vehicle, which is arranged in a rear-end region of the vehicle. The air guide device disclosed in said document has an air guide element which is in the form of a spoiler and which is displaceable by means of an adjusting motor between a rest position and an operating position. A joint arrangement serves for the displacement of the air guide element, which joint arrangement extends through passage openings of a lower shell, wherein the adjusting motor engages and said joint arrangement for the purposes of displacing the air guide element.

DE 10 2009 033 695 A1 has disclosed a rear-end region of a motor vehicle, in the case of which a spoiler drive of an air guide device is installed on a carrier bracket, which in turn is fastened to a body structure of the motor vehicle. The carrier bracket is fitted or held on holding rails by means of a plug-type connection, wherein the holding rails are installed on the body structure.

SUMMARY

An embodiment of the present invention provides an air guide device for a vehicle that is configured to be arranged in a rear-end region of the vehicle. The air guide device has: a static carrier, which is installable via installation brackets on a body structure of the vehicle, where each of the installation brackets is connected at a first portion to the body structure and at a second portion to a carrier; an air guide, which is displaceable relative to the static carrier between a retracted rest position and a deployed operating position; a kinematic link arrangement, which has multiple links via which the air guide is displaceable relative to the carrier, wherein the links of the kinematic link arrangement are mounted on first installation brackets of the installation brackets; and an adjusting motor, which acts on the kinematic link arrangement for the purposes of displacing the air guide relative to the carrier. The adjusting motor is mounted on a second installation bracket of the installation brackets. The carrier, which is made of plastic, is connected by a clip connection to the installation brackets, which comprise plastic or metal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
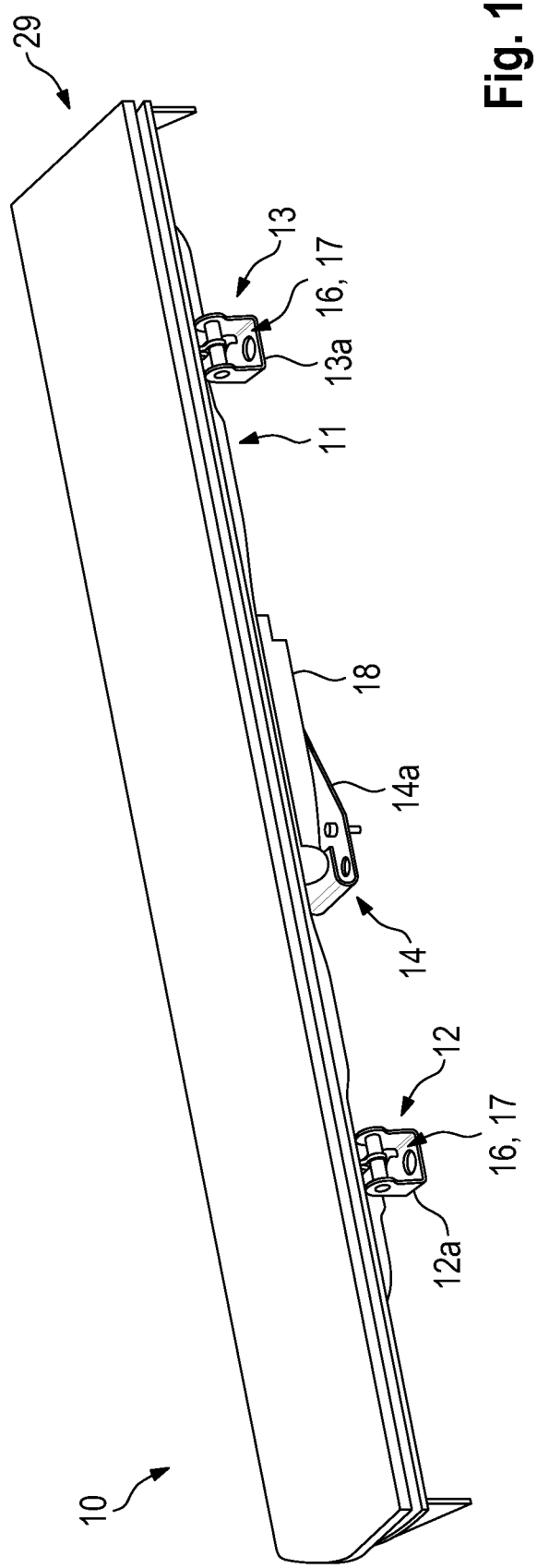
FIG. 1 shows a perspective view from above of an air guide device according to the invention for a vehicle.

The present invention provides a novel air guide device.

The air guide device according to an embodiment of the invention has a static carrier part which can be installed by means of installation brackets on a body structure of the vehicle, wherein each of the installation brackets is connected at a first portion to the body structure and at a second portion to the carrier part.

The air guide device according to an embodiment of the invention furthermore has an air guide element which is displaceable relative to the static carrier part between a retracted rest position and a deployed operating position.

The air guide device according to an embodiment of the invention furthermore has a kinematic link arrangement which has multiple links by means of which the air guide element is displaceable relative to the carrier part, wherein links of the kinematic link arrangement are mounted on first installation brackets.

The air guide device according to an embodiment of the invention furthermore has an adjusting motor which acts on the kinematic link arrangement for the purposes of displacing the air guide element relative to the carrier part, wherein the adjusting motor is mounted on a second installation bracket.

In the case of the air guide device according to an embodiment of the invention, the carrier part, which is manufactured from plastic, is connected by clip connection to the installation brackets, which are manufactured from plastic or metal.

In the case of the air guide device according to an embodiment of the invention, which has a static carrier part and an air guide element which is displaceable relative to the carrier part, the carrier part is installed by means of installation brackets on the body structure. Each of the installation brackets is connected at a first portion to the body structure and by means of a second portion to the carrier part. The carrier part, which is manufactured from plastic, is connected by clip connection to the installation brackets, which are manufactured from plastic or metal. This connection of the carrier part, which may also be referred to as installation carrier, to the installation brackets, by means of which the carrier part is ultimately attached to the body structure, is particularly preferred.

In one advantageous embodiment, spherical or joint-head-like anchoring elements are formed on the carrier part. Apertures are formed on the installation brackets, into which apertures there are inserted attachment elements with spherical or joint-socket-like recesses. The spherical or joint-head-like anchoring elements of the carrier part are clipped into the spherical or joint-socket-like recesses of the attachment elements. This connection of the carrier part to the second portions of the installation brackets is not only simple, but also, in this way, acoustic decoupling between carrier part and installation brackets is realized. A disadvantageous generation of noise in the region of the installation brackets or of the carrier part of the air guide device can be prevented in this way.

The attachment elements are preferably formed from rubber or from a rubber-elastic material. If the attachment elements are formed from rubber or from a rubber-elastic material, particularly advantageous acoustic decoupling can be provided.

The attachment elements preferably have, on an outer lateral surface, a groove into which a material web of the installation bracket, which delimits the respective aperture of the installation bracket, engages in positively locking fashion, in particular so as to form a tongue-and-groove connection between the respective attachment element and the respective installation bracket. This connection between the attachment elements and the installation brackets is particularly preferred.

Exemplary embodiments of the invention will be explained in greater detail using the drawings, without being restricted thereto.

FIG. 1 shows a perspective view of an air guide device 10 for a vehicle, specifically for a passenger motor vehicle, which is provided for being installed in a rear-end region of the vehicle on a body structure 15 of the vehicle, in particular behind a rear window of the vehicle.

The air guide device 10 has a static carrier part 11 and has an air guide element 29 which is displaceable relative to the static carrier part 11. FIG. 1 shows the air guide device 10 in a state in which the air guide element 29 is in a retracted rest position. In relation to this retracted rest position, the air guide element 29 can be displaced relative to the static carrier part 11, specifically into a deployed operating position, which is not shown in the figures.

Figure 2:
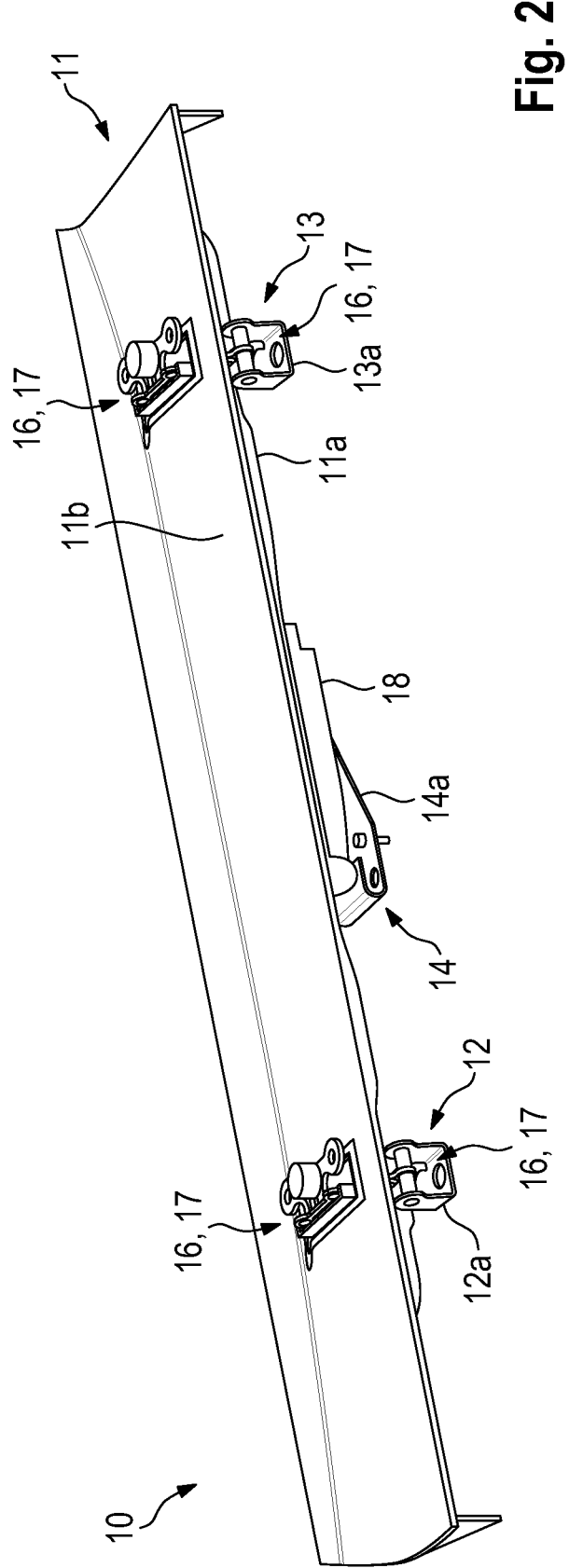
FIG. 2 shows the air guide device of FIG. 1 with a lifted-off or removed air guide element.
Figure 3:
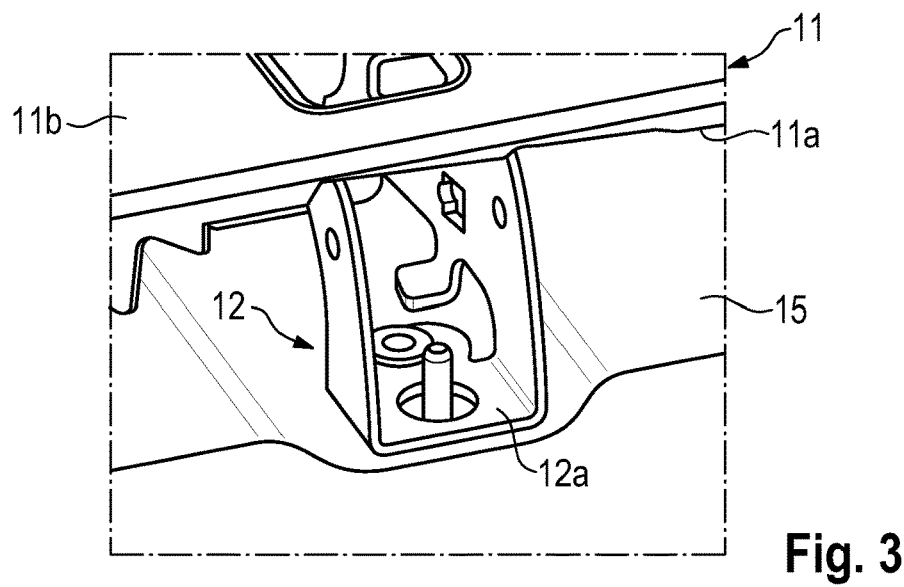
FIG. 3 shows a detail of FIG. 2.

Rather, FIG. 2 shows the air guide device 10 with a lifted-off or dismounted air guide element 29, and thus affords the view of the static carrier part 11 from above.

In the exemplary embodiment shown, the static carrier part 11 has a two-layer or two-ply construction composed of two parts 11a and 11 b. The part 11a is the carrier part itself, and the part 11b is a visually appealing panelling of the part 11a.

The carrier part 11, which can also be referred to as installation carrier, can be installed by means of installation brackets 12, 13 and 14 on the body structure 15. By means of first portions 12a, 13a and 14a, the respective installation bracket 12, 13 and 14 can be connected to the body structure 15. By means of second portions 12b, 13b and 14b situated opposite the first portions 12a, 13a and 14a, the respective installation bracket 12, 13 and 14 is connected to the carrier part 11, specifically to the part 11a thereof.

The air guide device 10 has a kinematic link arrangement 17, which has multiple links 16, and an adjusting motor 18.

The adjusting motor 18 is installed on the middle installation bracket 14 that can be seen in FIGS. 1 and 2. The middle installation bracket 14, which engages on a middle portion of the carrier part 11, serves not only for the fastening of the carrier part 11 to the body structure 15 but also for accommodating and bearing the adjusting motor 18.

The adjusting motor 18 engages on the kinematic link arrangement 17 in order, by means of the links 16 of the kinematic link arrangement 17, to displace the air guide element 29 relative to the carrier part 11 and thus displace said air guide element between the retracted rest position and the deployed operating position. Here, the kinematic link arrangement 17 has multiple links 16, of which only some links 16 are visible in FIGS. 1 and 2, specifically links 16 which are mounted on lateral installation brackets 12 and 13, wherein these lateral installation brackets 12 and 13 engage on lateral portions of the carrier part 11 and are accordingly positioned laterally adjacent to the middle installation bracket 14.

The present invention now relates in particular to the fastening of the carrier part 11, which can be referred to as installation carrier, to the second portions 12b, 13b, 14b of the respective installation bracket 12, 13 and 14. Here, FIGS. 4 and 5 shows a schematic cross section through the attachment region or connecting region of the carrier part 11 to an installation bracket, which may in each case be one of the installation brackets 12, 13 and 14.

The carrier part 11, specifically the part 11a thereof, which is formed from plastic, is connected by clip connection to the installation brackets 12, 13 and 14, which are manufactured from plastic or metal.

For the connection of the carrier part 11 to the installation brackets 12, 13 and 14, it is not necessary for metal bushings or metal inserts to be installed on the carrier part 11 in order for the carrier part 11 to thus be screwed together with the respective installation bracket 12, 13 and 14. Such a screw connection is omitted. Rather, the carrier part 11 is clipped together with the installation brackets 12, 13 and 14.

Figure 4:
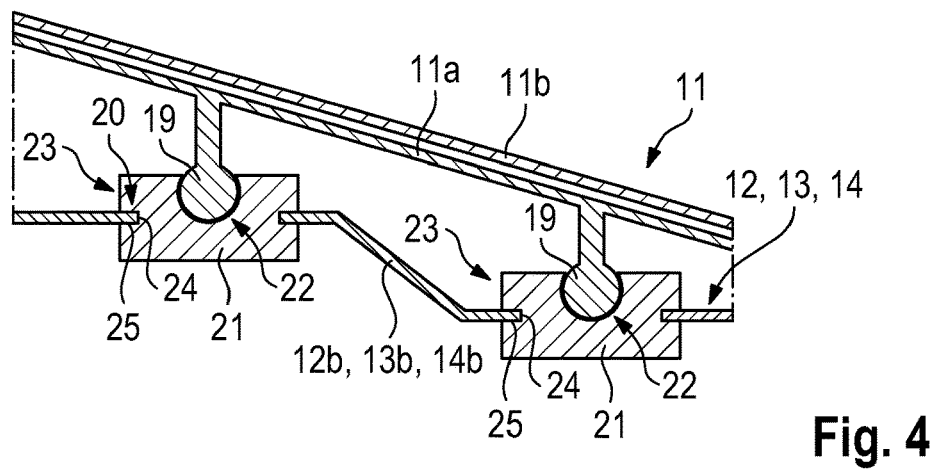
FIG. 4 shows a cross section through a first embodiment of the air guide device according to the invention.
Figure 5:
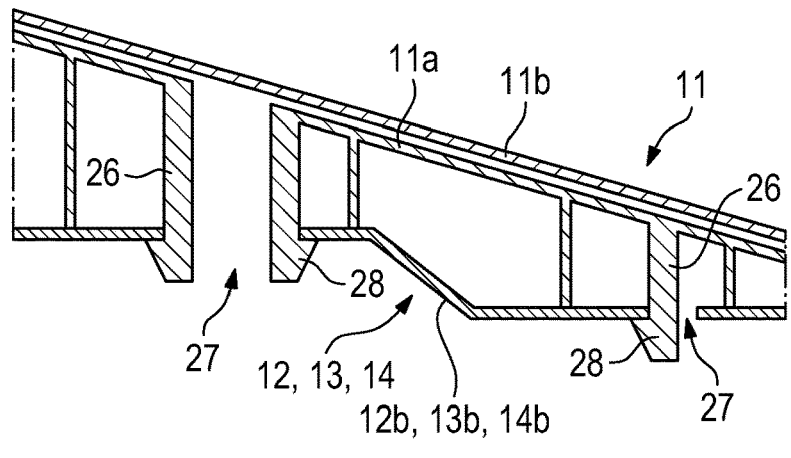
FIG. 5 shows a cross section through a second embodiment of the air guide device according to the invention.

Here, FIGS. 4 and 5 show two possible variants for the clip connection of carrier part 11 and installation brackets 12, 13 and 14, wherein the variant of FIG. 4 is particularly preferred.

In the variant of FIG. 4, spherical or joint-head-like anchoring elements 19 are formed on the carrier part 11, specifically on the part 11a of the carrier part 11. On the respective installation bracket 12, 13 and 14, specifically on the respective second portion 12b, 13b and 14b thereof, there are formed apertures 20 into which attachment elements 21 with spherical or joint-socket-like recesses 22 are inserted. The spherical or joint-head-like anchoring elements 19 of the carrier part 11 are clipped into the spherical or joint-socket-like recesses 22 of the attachment elements 21.

The attachment elements 21 are preferably attachment elements composed of rubber or a rubber-elastic material. These are cylindrical or of circular cross section, wherein, into an outer lateral surface 23 of the respective attachment element 21, there is formed an encircling groove 24 into which a material web 25, which delimits the respective aperture 20, of the respective installation bracket 12, 13 and 14 engages in positively locking fashion so as to form a tongue-and-groove connection.

The variant of FIG. 4 is not only preferred for the simple connection of the carrier part 11 to the installation brackets 12, 13 and 14, but the variant of FIG. 4 also provides acoustic decoupling of the carrier part 11 from the installation brackets 12, 13 and 14 and thus from the body structure 15. Undesired generation of noise can thus be avoided.

FIG. 5 shows a variant of the clip connection of carrier part 11 to the respective installation bracket 12, 13 and 14, in the case of which barb-like anchoring elements 26 are formed on the carrier part 11, which anchoring elements are clipped into apertures 27 of the respective installation bracket 12, 13 and 14. The barb-like anchoring elements 26 are in this case formed on the part 11a of the carrier part 11, and have insertion ramps 28, by means of which the barb-like anchoring element 26 can be clipped into and held in the respective aperture 27 of the respective installation bracket 12, 13 and 14. With this clip connection, it is also possible the carrier part 11 to be easily connected to the respective installation bracket 12, 13 and 14, but without the acoustic decoupling that is provided in the variant of FIG. 4.

The invention permits a simple and reliable connection of the carrier part 11 to the installation brackets 12, 13 and 14, preferably with provision of acoustic decoupling. Through the omission of inserts and screws, the number of components required is reduced. The installation outlay and the time required for the installation can be reduced.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An air guide device for a vehicle, the air guide device configured to be arranged in a rear-end region of the vehicle, the air guide device comprising:
   a static carrier, which is installable via installation brackets on a body structure of the vehicle, wherein each of the installation brackets is connected at a first portion to the body structure and at a second portion to a carrier;
   an air guide, which is displaceable relative to the static carrier between a retracted rest position and a deployed operating position;
   a kinematic link arrangement, which has multiple links via which the air guide is displaceable relative to the carrier, wherein the links of the kinematic link arrangement are mounted on first installation brackets of the installation brackets; and
   an adjusting motor, which acts on the kinematic link arrangement for the purposes of displacing the air guide relative to the carrier, wherein the adjusting motor is mounted on a second installation bracket of the installation brackets,
   wherein the carrier, which is made of plastic, is connected by a clip connection to the installation brackets, which comprise plastic or metal.

2. The air guide device as claimed in claim 1, wherein barb-like anchoring elements are formed on the carrier, and on which anchors are clipped into apertures formed on the respective installation brackets.

3. The air guide device as claimed in claim 1, wherein:
   spherical or joint-head-like anchors are formed on the carrier,
   apertures are formed on the installation brackets, the apertures having inserted therein attachment elements having spherical or joint-socket-like recesses, and
   the spherical or joint-head-like anchors of the carrier are clipped into the spherical or joint-socket-like recesses of the attachment elements.

4. The air guide device as claimed in claim 3, wherein the attachment elements are formed from rubber or from a rubber-elastic material.

5. The air guide device as claimed in claim 3, wherein the attachment elements have, on an outer lateral surface, a groove into which a material web of the installation bracket, which delimits the respective aperture of the installation bracket, engages in a positively locking fashion.

6. The air guide device as claimed in claim 5, wherein the material web of the installation bracket, which delimits the respective aperture of the installation bracket, engages into the groove of the respective attachment element so as to form a tongue-and-groove connection.

* * * * *